US009429942B2

(12) United States Patent
Scacchi

(10) Patent No.: US 9,429,942 B2
(45) Date of Patent: Aug. 30, 2016

(54) METHOD AND DEVICE FOR AUTOMATICALLY GUIDING AN AIRCRAFT TAXIING ON THE GROUND

(71) Applicant: Airbus Operations (SAS), Toulouse (FR)

(72) Inventor: Pierre Scacchi, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 22 days.

(21) Appl. No.: 14/538,372

(22) Filed: Nov. 11, 2014

(65) Prior Publication Data

US 2015/0142220 A1 May 21, 2015

(30) Foreign Application Priority Data

Nov. 15, 2013 (FR) ...................................... 13 61240

(51) Int. Cl.
*G05D 1/00* (2006.01)
*G05D 1/02* (2006.01)

(52) U.S. Cl.
CPC .......... *G05D 1/0083* (2013.01); *G05D 1/0202* (2013.01)

(58) Field of Classification Search
CPC .... G01C 23/00; B60C 13/18; G05D 1/0083; G05D 1/0202
See application file for complete search history.

(56) References Cited

U.S. PATENT DOCUMENTS

| 4,219,093 | A | * | 8/1980 | Lang | B62D 5/09 180/401 |
| 4,361,202 | A | * | 11/1982 | Minovitch | B60K 31/0008 104/88.02 |
| 4,482,961 | A | * | 11/1984 | Kilner | G05D 1/0083 244/183 |
| 5,008,825 | A | * | 4/1991 | Nadkarni et al. | 701/4 |
| 5,677,685 | A | * | 10/1997 | Coirier | G05D 1/0607 244/184 |
| 5,983,161 | A | * | 11/1999 | Lemelson | G01S 19/11 340/436 |
| 6,111,526 | A | * | 8/2000 | Aymeric | G01C 23/005 244/181 |
| 8,560,149 | B1 | * | 10/2013 | Ganguli | G01C 23/005 701/15 |
| 2003/0187577 | A1 | * | 10/2003 | McClure | A01B 69/008 701/23 |
| 2004/0059497 | A1 | * | 3/2004 | Sankrithi | B64C 25/50 701/120 |
| 2004/0230353 | A1 | | 11/2004 | Villaume et al. | |
| 2006/0116798 | A1 | * | 6/2006 | Gibson | A01B 69/008 701/26 |

(Continued)

FOREIGN PATENT DOCUMENTS

EP 1477872 11/2004

OTHER PUBLICATIONS

French Search Report, Sep. 9, 2014.

*Primary Examiner* — Jelani Smith
*Assistant Examiner* — Kelly D Williams
(74) *Attorney, Agent, or Firm* — Greer, Burns & Crain, Ltd.

(57) ABSTRACT

A device comprises a monitoring unit configured to automatically monitor the actuation of a manual control member suitable for controlling an aircraft on the ground, so as to be able to detect a releasing of the control member in a neutral position. A computation unit is configured to compute a virtual axis for guiding the aircraft on the ground, upon the detection of the releasing of the control member in the neutral position. A guiding unit is configured to automatically guide the aircraft along said virtual axis.

11 Claims, 2 Drawing Sheets

(56) References Cited

U.S. PATENT DOCUMENTS

| | | | |
|---|---|---|---|
| 2009/0201177 A1* | 8/2009 | Soler | 340/974 |
| 2011/0004376 A1* | 1/2011 | Chatrenet | B64C 25/426 701/41 |
| 2012/0130593 A1* | 5/2012 | Davis | B62D 1/28 701/41 |
| 2013/0197762 A1* | 8/2013 | Schuberth | B62D 5/008 701/42 |
| 2013/0200209 A1* | 8/2013 | Goldman | B64C 25/405 244/50 |
| 2013/0297102 A1* | 11/2013 | Hughes | G05D 1/0083 701/3 |
| 2014/0114557 A1* | 4/2014 | Nutaro | G01C 21/00 701/121 |

* cited by examiner

METHOD AND DEVICE FOR AUTOMATICALLY GUIDING AN AIRCRAFT TAXIING ON THE GROUND

CROSS-REFERENCES TO RELATED APPLICATIONS

This application claims the benefit of the French patent application No. 1361240 filed on Nov. 15, 2013, the entire disclosures of which are incorporated herein by way of reference.

BACKGROUND OF THE INVENTION

The present invention relates to a method and a device for automatically guiding an aircraft taxiing on the ground.

It is known that aircraft, in particular transport airplanes, are equipped with aeronautical systems making it possible to automatically follow an axis or a heading on the ground. An automatic landing is in particular known that is based on following a guiding beam of ILS (Instrument Landing System) type, which makes it possible on the one hand to guide the aircraft in flight, horizontally and vertically, and on the other hand to guide the aircraft on the ground, only horizontally to the end of a runway, by implementing a so-called "roll-out" maneuver. This maneuver makes it possible to guide the aircraft laterally on the ground so as to keep it on the central axis of the runway indicated by the ILS beam. The aircraft can be guided manually, by indicating to the pilot the position of the aircraft relative to the beam, or else automatically using an automatic piloting system. Other, similar guiding assistance devices are known, such as a system of GLS (GPS Landing System) type, a system of SLS (Satellite Landing System) type, or a system of MLS (Microwave Landing System) type, which require infrastructures on the ground or the involvement of satellites.

In the absence of infrastructures of ILS type or similar infrastructures on an airport, there is no device that makes it possible to automatically guide the aircraft along an axis after landing. Furthermore, the use of a system of ILS or similar type enforces following the axis indicated by the beam, and therefore leaves the pilot no latitude, in particular for shifting slightly onto a parallel to the central axis of the runway, in order, for example, to avoid taxiing over lamps installed along the central axis, which is uncomfortable for the pilot and the passengers. On the other hand, in manual piloting mode, a simple shift of the aircraft, for example by one meter to the left or the right of the central axis of the runway is sufficient to avoid taxiing over the lamps.

Moreover, on take-off or upon a rejected take-off of RTO type, there is no device that makes it possible to automatically guide the aircraft along an axis, in order in particular to assist the pilot in certain conditions rendering the piloting more difficult, such as a strong cross wind, a system failure (for example a brake failure on one of the landing gears, resulting in involuntary differential braking), or an engine failure.

SUMMARY OF THE INVENTION

An object of the present invention is to remedy this drawback, and it comprises a method enabling the aircraft to automatically follow a virtual axis computed onboard the aircraft.

More specifically, it relates to a method for automatically guiding an aircraft taxiing on the ground, the aircraft comprising at least one control member, configured to be manually actuated, suitable for controlling the aircraft laterally on the ground and suitable for being brought into a neutral position.

According to the invention, said method is noteworthy in that it comprises the following steps, implemented automatically, and comprising:

in monitoring the actuation of said control member so as to be able to detect a releasing of the control member in said neutral position; and upon the detection of such a releasing of the control member:

b1) in automatically defining a virtual axis onboard the aircraft; and b2) in automatically guiding the aircraft on the ground along said virtual axis.

Thus, a virtual axis is computed automatically upon the releasing of the control member, regardless of the phase on the ground in which the aircraft is moving, on a landing and take-off runway, or on a taxiing area of an airport. Consequently, the guiding method according to the invention does not require any device or infrastructure external to the aircraft, to implement an automatic guidance along a virtual axis that is computed automatically. This axis is followed by the aircraft in order to maintain an appropriate trajectory on the ground, despite any possible events linked to the climate or failures.

According to different embodiments of the invention, which will be able to be taken individually or in combination:

in the step b1), said virtual axis is computed automatically from the position and the heading of the aircraft at the moment when the control member is brought into said neutral position;

in the step b1), said virtual axis corresponds to a reference axis, likely to be chosen by a pilot of the aircraft;

in the step b1), said virtual axis corresponds to a virtual guiding axis according to which the aircraft was guided, before a last use of the control member;

said method comprises a display step consisting in displaying said virtual axis on a display unit of the aircraft;

said display step consists in displaying said virtual axis on a head-up display system in true vision mode;

said method comprises a step enabling a pilot to modify said virtual axis;

the modification of the virtual axis is performed by a transverse displacement;

the modification of the virtual axis is performed by a transverse displacement by pivoting said axis about a point.

The present invention also relates to a device for automatically guiding an aircraft taxiing on the ground, the aircraft being provided with a control member configured to be manually actuated, suitable for controlling the aircraft laterally on the ground and suitable for being brought into a neutral position.

According to the invention, said device is noteworthy in that it comprises:

a monitoring unit configured to automatically monitor the actuation of said control member so as to be able to detect a releasing of the control member in said neutral position;

a computation unit configured to compute a virtual axis for guiding the aircraft on the ground, upon the detection of the releasing of the control member in said neutral position; and a guiding unit configured to automatically guide the aircraft along said virtual axis.

Said device may further comprise an axis designator configured to enable the pilot to modify said virtual axis.

Said axis designator advantageously being able to comprise two modification units, a first modification unit configured to modify said virtual axis by a parallel displacement and a second modification unit configured to modify said virtual axis by pivoting said virtual axis about a point.

The invention relates also to an aircraft, in particular a transport airplane, comprising such an automatic guiding device.

BRIEF DESCRIPTION OF THE DRAWINGS

The figures of the attached drawing will give a clear understanding as to how the invention can be produced. In these figures, identical references designate similar elements.

DETAILED DESCRIPTION OF THE PREFERRED EMBODIMENTS

Figure 1:
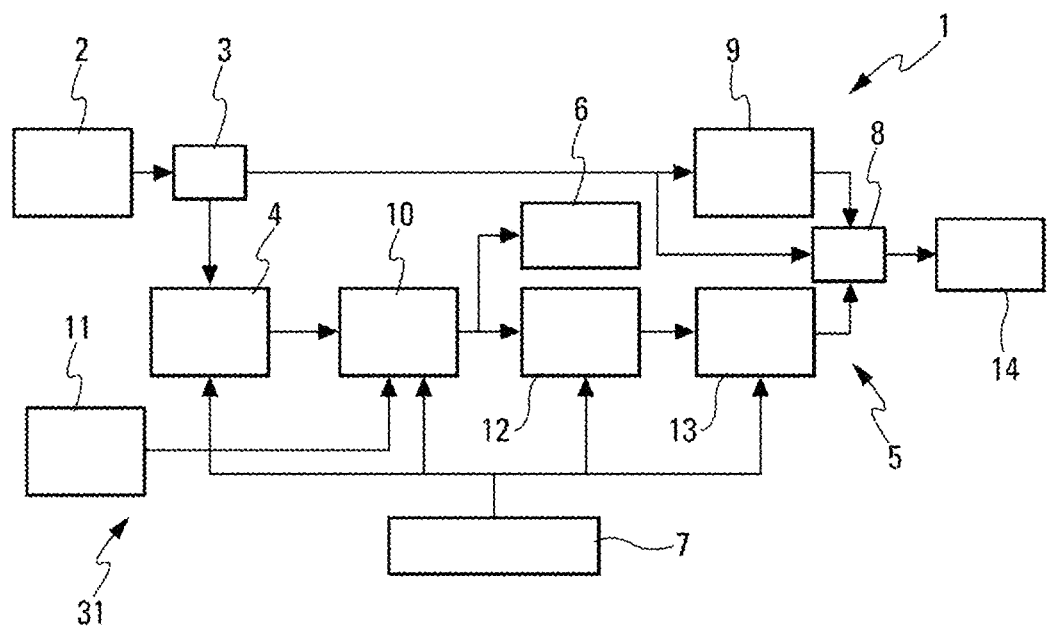
FIG. 1 is a block diagram of a device illustrating the invention.

The device 1 schematically represented in FIG. 1, which illustrates the invention, is a device for automatically guiding an aircraft taxiing on the ground. The aircraft is provided with at least one standard control member 2, for example a control wheel of the front wheel or a rudder bar, making it possible to control the aircraft laterally on the ground. This control member 2 is actuated manually by a pilot and can be brought into a neutral position.

According to the invention, the device 1 comprises:

a monitoring unit 3 configured to monitor the actuation of said control member 2 so as to be able to detect a releasing of the control member 2 in said neutral position;

a computation unit 4 configured to compute a virtual axis for guiding the aircraft on the ground; and a guiding unit 5 configured to automatically guide the aircraft along said virtual axis.

Consequently, the monitoring unit 3 monitors the actuation of said control member 2 in order to detect a releasing of the control member 2 in the neutral position.

When the monitoring unit 3 detects such a releasing, it signals it to the computation unit 4. The computation unit 4 then computes a virtual axis for guiding the aircraft on the ground, which is transmitted to the guiding unit 5. The guiding unit 5 then automatically guides the aircraft along this virtual axis.

The invention thus makes it possible to define a virtual axis on the ground, in order to automatically provide guidance of the aircraft along this virtual axis, in ground phases (taxiing, take-off, RTO, landing). Moreover, it makes it possible to generalize the implementation of a guidance along an axis (like a maneuver of roll-out type when it is based on an ILS beam or similar, on landing) for all the ground phases, without having to use any infrastructure for example of ILS or similar type. By virtue of the device 1, the pilots can be assisted for all the ground phases.

In a first embodiment, the virtual axis is computed by the computation unit 4 from the position and the heading of the aircraft at the moment when the control member 2 is brought into the neutral position. An axis following law is automatically engaged to keep the aircraft on the duly defined virtual axis. At any moment, the crew can retake control by virtue of the control member 2 (for example to perform a turn at low speed, or to align the aircraft accurately on the runway). A new axis is defined when the crew releases the control member 2, and so on.

In this first embodiment, the crew must therefore redefine a new axis by correctly positioning the aircraft (in terms of heading and position on the ground) if the current virtual axis is not satisfactory. For example, it must manually perform a maneuver using the control member 2 if it wants to define a new virtual axis parallel to the current virtual axis. This operation is the same over all of the airport, notably on the runway and on the taxiing lanes.

In a second embodiment, the virtual axis is computed by the computation unit 4 from a reference axis, such as the central axis 30 of the runway or a guiding beam of ILS or similar type.

If the aircraft is in the taxiing phase and is ready to be aligned for take-off, the initialization can be done on the center of the runway when the aircraft enters said runway. For this, the device 1 has access to a database containing the coordinates of the runway and its current position relative to the elements of this database which forms part of a set of information sources 7. Thus, just before the take-off, when the crew finishes the last turn which brings it into alignment on the central axis of the runway, the virtual axis is initialized, not on the current heading and position of the aircraft as in the first embodiment, but on the central axis 30 of the runway defined in the database.

This operation of initialization on the central axis of the runway is specific to an area defined by the outline of the runway, and is conditioned by the fact that the aircraft is located globally aligned on the runway, for example if it is located within a heading range centered on the heading of the runway and if it is situated within the outline of the runway.

If the aircraft is on approach and about to land, the pilot can choose to initialize, using the computation unit 4, the virtual axis on a reference of his or her choice, for example on the coordinates of the runway stored in a database as for the take-off, or on a beam of ILS type if the runway is so equipped, or from a reference of a similar device.

In a third embodiment, the virtual axis is computed by the computation unit 4 from a virtual guiding axis according to which the aircraft was guided, before the last use of the control member 2.

Thus, the virtual axis defined upon the releasing of the control member 2 is not a new axis defined by the current position and heading of the aircraft at the moment of the releasing as in the first embodiment, but the axis previously designated prior to the use of the control member 2. The main advantage of this third embodiment is to avoid a phenomenon of PIO (Pilot Induced Oscillations) on the part of the pilot's seeking to be realigned suddenly at high speed, a phenomenon which can potentially result in lateral departures from the runway. If the axis is still the central axis of the runway upon the releasing of the control member 2, the device 1 automatically performs the realignment. This operation is intended for the area defined by the outline of the runway, and only for the take-off, rejected take-off of RTO type or landing phases.

Whatever the embodiment, the virtual axis following law is activated once the aircraft is on the ground. For this, the device 1 computes the lateral and angular deviations of the current position of the aircraft relative to the virtual axis.

The invention notably provides the following advantages:

it generates a compensation of the disturbances, because any imbalance in the forces exerted on the aircraft is automatically corrected by the device 1, such as a cross wind, an engine failure on take-off, residual differential braking, a thrust reverser failing in a landing, taxiing on the ground with an engine off, a mechanical bias on the orientation of the front landing gear, or even a runway or a taxiing lane with slight banking, contrary to a usual guiding function based on following a heading, no lateral drift of the aircraft occurs over time, because the device 1 locks the aircraft onto a virtual axis and not onto a heading, the piloting is facilitated, not only for the situations requiring, from the crew, strong piloting technique skills, for example in the case of an engine failure on take-off, but also in the situations that require little in the way of piloting skills, for example in the case of a mechanical bias on the orientation of the front landing gear, which compels the crew to continually make small trajectory corrections to follow the central line of a taxiing lane, and which can prove particularly tough if the taxiing phase is long, the invention providing piloting comfort, on a taxiing lane, the device 1 makes it possible to lighten the workload of the pilot, notably on long straight lines, because the pilot does not have to permanently pilot the orientation of the aircraft from the moment when the axis that he or she previously defined is correctly superposed on the central line of the taxiing lane or of the runway.

As indicated above, in the first embodiment, the virtual axis is defined upon the releasing of the control member or members 2, by the heading $\Psi_{AC}$ and the position of the aircraft $(X,Y)_{AC}$ at the moment of the releasing. Such information is supplied by the usual systems for measuring aircraft inertial and position parameters that form part of the set of information sources 7. Thus, when $|\beta| \text{THR}_\beta$, where $\beta$ is the order from the control member 2 and $\text{THR}_\beta$ is a threshold close to the neutral position of the control member 2, the monitoring unit 3 signals it to the computation unit 4 for the values of the heading $\Psi_{ref}$ and of a reference point $(X,Y)_{ref}$ of the virtual axis 15 to be initialized on the current values of the aircraft $\Psi_{AC}$ and $(X,Y)_{AC}$.

The lateral deviation $\delta_y$ of the aircraft relative to the virtual axis can be computed as follows:

$$\delta_y = \sqrt{(X_{Ac}-X_p)^2 + (Y_{Ac}-Y_p)^2};$$

with:

$$\begin{cases} X_p = X_{ref} + t\cos(\Psi_{ref}) \\ Y_p = Y_{ref} + t\sin(\Psi_{ref}) \end{cases};$$

in which $t = (X_{AC}-X_{ref})\cos(\Psi_{ref}) + (Y_{AC}-Y_{ref})\sin(\Psi_{ref})$.

Furthermore, the angular deviation $\delta\Psi$ of the aircraft relative to the virtual axis can be computed as follows:

$$\delta = (\Psi_{ref} - \Psi_{AC})[2\pi].$$

Thus, the guiding unit 5 computes the lateral and angular deviations to lock the aircraft onto the defined virtual axis, using an axis following law. This law is not described, numerous examples of laws fulfilling this function being available in the literature and known to those skilled in the art. It may be, for example, the usual law which locks the aircraft along an ILS or similar axis on the ground during an automatic landing.

The device 1 comprises, in the guiding unit 5, a choice (or selection) system configured to choose between a manual control law and an automatic axis following law, the choice being made by means of a set of logics, not described here because they are specific to the implementation on a given aircraft, but the general principle of which consists in choosing the manual control law when the control member 2 is deflected, and the axis following law when the control member 2 is in the neutral position.

The device 1 further comprises at least one display unit 6 for displaying the virtual axis in the cockpit of the aircraft. The device 1 comprises, as display unit 6, notably a head-up display device of HUD type, in true vision mode, that is to say that the axis represented is superposed on the outside reality as if it were part of the environment.

The head-up device can also incorporate more complex systems, such as, for example:

a system of SVS (Synthetic Vision System) type, which allows for a synthetic reconstruction of certain elements of the environment, such as the outlines of the runway, a system of EVS (Enhanced Vision System) type, which uses optical sensors or a radar to enhance the outside view of the pilot.

In both cases, the present invention can be used jointly with these systems.

It is also possible to use the principle of projection onto a head-down display device, for example in SVS vision mode by representing the runway or the surrounding taxiing lanes in a synthetic manner. Thus, the display unit 6 can display the virtual axis directly in the reconstructed synthetic environment. In EVS vision mode, the display unit 6 superposes the virtual axis defined by the pilot on the image taken by the optical sensor.

Figure 2:
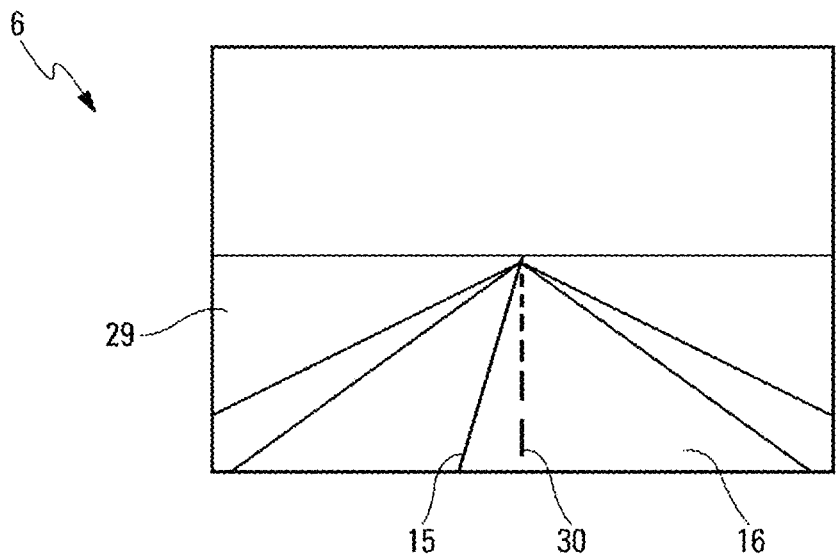
FIG. 2 is a representation of a display means comprising a virtual axis.

FIG. 2 gives an example of a possible display of the virtual axis 15 corresponding to the invention in a head-up display device 29, when the aircraft is on a runway 16, for which the central axis 30 is represented. In this example, the virtual axis 15 is slightly offset to the left of the central axis 30 in the direction of taxiing of the aircraft.

Furthermore, the display unit 6 can also comprise a navigation display device (not represented), for example with a representation of the runway of the airport in plan view, of OANS (On-board Airport Navigation System) type, in order to indicate the position of the virtual axis defined by the pilot on the representation of the airport.

The virtual axis 15 is displayed preferentially on a head-up device in true vision mode, in order to enhance the acknowledgement of the environment and of the current situation of the crew, by representing the virtual axis 15 followed by the aircraft. This representation, which appears fixed on the ground from the point of view of the crew, indicates to the latter that the device 1 is automatically managing the following of the aircraft on the virtual axis represented. The crew is therefore less tempted to retake manual control of the aircraft that might lead to phenomena of PIO type, notably in the case of engine failure on take-off.

A true display in a head-up display device consists in projecting a position of the 3D space, a point $(X'_{ref}, Y'_{ref}, 0)$, in which 0 signifies that the point is a point of the runway (zero altitude relative to the runway) on a 2D screen, knowing the relative distance between the point and the cockpit of the aircraft, the height relative to the runway, and the orientation of the aircraft in the space. It is then sufficient to plot, on the head-up display device, a line between this point and the point of the heading horizon.

In FIG. 1, the device 1 further comprises a modification unit 31 which comprises a modification member called "axis designator" 11, enabling a pilot to modify said virtual axis, and adjust the current axis without having to redefine it completely using the computation unit 4. This modification unit 31 further comprises a modification system 10 specified hereinbelow. The crew can, at any moment, use the axis designator 11 to modify the current virtual axis in order to perfectly align the virtual axis on the central axis 30 of the runway, for example if the initialization of the axis using the database is imperfect.

In a preferred embodiment, this axis designator 11 comprises:

a first modification unit comprising, for example, two left/right buttons, a left/right handle, or a touchpad, making it possible to laterally shift the current axis in a direction at right angles to the direction of the axis, in order to obtain an axis parallel to the preceding one with an identical heading, as specified hereinbelow with reference to FIG. 3; and a second modification unit, comprising, for example, a thumbwheel, of mouse wheel type or else a rotary selector, making it possible to modify the heading of the virtual axis 15, as specified hereinbelow with reference to FIG. 4.

The modifications of the virtual axis 15, thus made by the crew, are immediately displayed in the display unit 6 (for example on the HUD device), and the locking of the aircraft immediately uses this new axis as a new reference to be followed, this operation being the same over all of the airport, notably on the runway 16 and on the taxiing lanes.

Since the virtual axis 15 can be adjusted at will by the pilot, the latter can easily slightly shift the virtual axis so as in particular to avoid taxiing over lamps on the central axis 30 of the runway 16.

The pilot can thus use the axis designator 11 to modify the current virtual axis (if the latter is active, that is to say if the control member is in the neutral position), by performing a lateral shift $\Delta y$ or else an angular shift $\Delta \Psi$.

Figure 3:
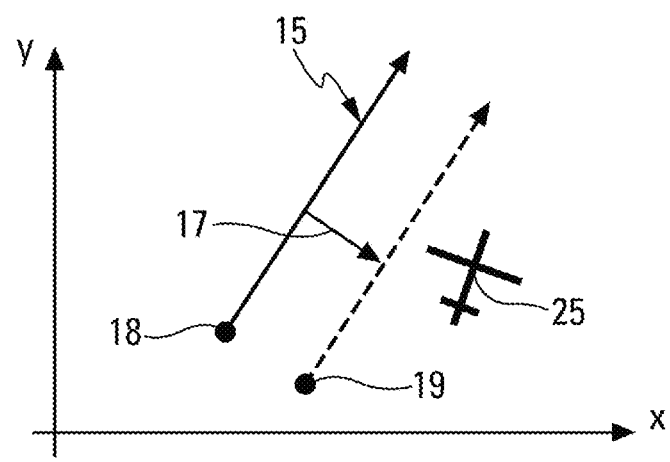
FIG. 3 is a representation of a parallel modification of the virtual axis.

FIG. 3 illustrates a modification of the virtual axis 15 performed by a parallel displacement (illustrated by an arrow 17) from a first position 18 to a second position 19. The pilot of the aircraft 25 uses the first modification unit of the axis designator to laterally shift the virtual axis 15, the new reference point $(X,Y)'_{ref}$ being the second position 19 of coordinates:

$$\begin{cases} X'_{ref} = X_{ref} + \Delta y \sin(\Psi_{ref}) \\ Y'_{ref} = Y_{ref} - \Delta y \cos(\Psi_{ref}) \end{cases};$$

with $\Delta y$ being the lateral offset requested by the pilot via the axis designator 11. The heading $\Psi_{ref}$ of the virtual axis thus remains unchanged.

Figure 4:
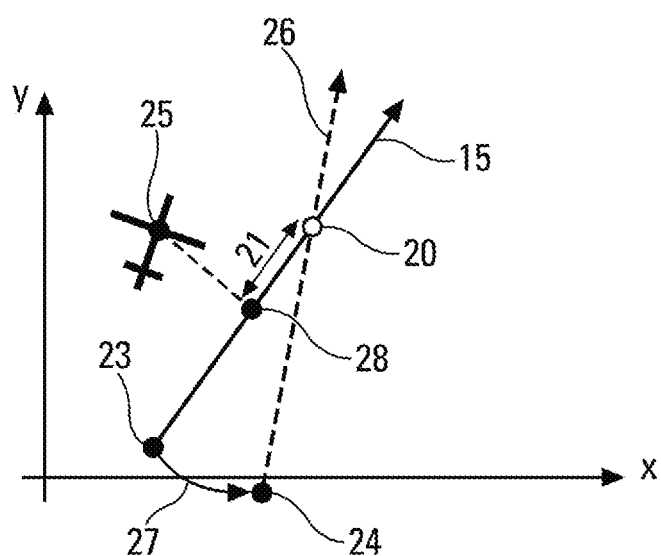
FIG. 4 is a representation of a modification of the virtual axis by pivoting about a point.

In FIG. 4, the modification of the virtual axis is performed by pivoting said virtual axis 15 about a point 20 from a first position 23 to a second position 24. The pilot of the aircraft 25 uses the second modification unit (specified hereinabove) of the axis designator 11 to adjust the heading of the virtual axis 15, the new axis 26 then being defined by the new heading $\Psi'_{ref}$ and the second position 24 $(X,Y)'_{ref}$ which is a new reference point of the virtual axis 15, of coordinates:

$$\begin{cases} \Psi'_{ref} = (\Psi_{ref} + \Delta \Psi)[2\pi] \\ X'_{ref} = X_{rot} + (X_{ref} - X_{rot})\cos(\Delta \Psi) - (Y_{ref} - Y_{rot})\sin(\Delta \Psi) \\ Y'_{ref} = Y_{rot} + (X_{ref} - X_{rot})\sin(\Delta \Psi) + (Y_{ref} - Y_{rot})\cos(\Delta \Psi) \end{cases}$$

with:

$\Delta \Psi$ being the angular shift 27 requested by the pilot via the axis designator 11;

$$\begin{cases} X_{rot} = X_{ref} + (t+d)\cos(\Psi_{ref}) \\ Y_{rot} = Y_{ref} + (t+d)\sin(\Psi_{ref}) \end{cases};$$

$$t=(X_{AC}-X_{ref})\cos(\Psi_{ref})+(Y_{AC}-Y_{ref})\sin(\Psi_{ref});$$

d being the distance 21 between the projection 28 of the position of the aircraft on the axis and the center of rotation $(X,Y)_{rot}$ of the axis defined by the point 20. This distance 21 can be chosen in such a way that the center of rotation $(X,Y)_{rot}$ is sufficiently forward of the aircraft 25 to be visible to the pilot.

In the preferred embodiment of FIG. 1, the control member 2 supplies the parameter $\beta$, which is transmitted to a manual control system 9 defining the manual control law, and to the computation unit 4 and to the choice system 8. The device 1 also comprises the axis designator 11 which gives the parameters $\Delta y$ and $\Delta \Psi$ to the axis modification system 10, and the set 7 of information sources of the aircraft which is linked to the computation unit 4, to the axis modification system 10, to a diversion computation system 12 and to an axis following system 13 defining the axis following law of the aircraft. The manual control system 9 of the axis defines a parameter $\delta_a^m$ sent to the choice system 8. The computation unit 4 supplies the parameters $\Psi_{ref}$ and $(X,Y)_{ref}$ to the axis modification system 10. The axis modification system 10 computes the parameters $\Psi'_{ref}$ and $(X,Y)'_{ref}$ to transmit them to the diversion computation system 12 and to the display unit 6. The diversion computation system 12 computes the parameters $\delta_y$ and $\delta \Psi$ and sends them to the axis following system 13 which defines a parameter $\delta_a^s$ in order to supply it to the choice system 8. The choice system 8 chooses the parameter $\delta_a^m$ or $\delta_a^s$, which is to be sent to usual actuators 14 allowing for the piloting of the aircraft, namely the first parameter $\delta_a^m$ if the control member 2 is in operation, and the second parameter $\delta_a^s$ if the control member 2 is in neutral position.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A method for automatically guiding an aircraft taxiing on the ground, the aircraft comprising at least one control member configured to be manually actuated, suitable for controlling the aircraft laterally on the ground and suitable for being brought into a neutral position, said method comprising the following steps, implemented automatically:
   a) monitoring the actuation of said control member for detecting a releasing of the control member in the neutral position;
   b) automatically guiding the aircraft on the ground along an axis upon the detection of the releasing of the control member; and
   c) upon the detection of the releasing of the control member:
      c1) automatically defining a virtual axis onboard the aircraft; and c2) automatically guiding the aircraft on the ground along said defined virtual axis, and modifying said virtual axis by using at least one of two modification units: a first modification unit configured to modify said virtual axis by a parallel displacement and a second modification unit configured to modify said virtual axis by the pivoting of said virtual axis about a point.

2. The method as claimed in claim 1, wherein, in step c1), said virtual axis is computed automatically from a position and a heading of the aircraft at the moment when the control member is brought into said neutral position.

3. The method as claimed in claim 1, wherein, in the step c1), said virtual axis corresponds to a reference axis, chosen by a pilot of the aircraft.

4. The method as claimed in claim 1, wherein, in the step c1), said virtual axis corresponds to a virtual guiding axis according to which the aircraft was guided, prior to a last use of the control member.

5. The method as claimed in claim 1, further comprising a display step comprising displaying said virtual axis on a display unit of the aircraft.

6. The method as claimed in claim 5, wherein said display step comprises displaying said virtual axis on a head-up display device in true vision mode.

7. A device for automatically guiding an aircraft taxiing on the ground, the aircraft being provided with a control member configured to be manually actuated, configured for controlling the aircraft laterally on the ground and suitable for being brought into a neutral position, said device comprising:
- a monitoring unit configured to automatically monitor the actuation of said control member and to detect a releasing of the control member in the neutral position;
- a guiding unit configured to automatically guide the aircraft along an axis,
- a computation unit configured to compute a virtual axis for guiding the aircraft on the ground, upon the detection of the releasing of the control member in said neutral position; and
- an axis designator configured to modify said virtual axis by using at least one of two modification units: a first modification unit configured to modify said virtual axis by a parallel displacement; and a second modification unit configured to modify said virtual axis by the pivoting of said virtual axis about a point, the guiding unit being configured to automatically guide the aircraft along said virtual axis based on said modified virtual axis.

8. An aircraft comprising:
a device for automatically guiding the aircraft taxiing on the ground, the aircraft being provided with a control member configured to be manually actuated, configured for controlling the aircraft laterally on the ground and configured for being brought into a neutral position;
- a monitoring unit configured to automatically monitor the actuation of said control member and to detect a releasing of the control member in the neutral position;
- a guiding unit configured to automatically guide the aircraft along an axis;
- a computation unit configured to compute a virtual axis for guiding the aircraft on the ground, upon the detection of the releasing of the control member in said neutral position; and
- an axis designator configured to modify said virtual axis by using at least one of two modification units: a first modification unit configured to modify said virtual axis by a parallel displacement; and a second modification unit configured to modify said virtual axis by the pivoting of said virtual axis about a point, the guiding unit being configured to automatically guide the aircraft along said virtual axis based on said modified virtual axis.

9. The method of claim 1, wherein modifying the virtual axis is performed by an axis designator that includes at least one of the first modification unit and the second modification unit,
- the first modification unit includes a first input device allowing the modification of the virtual axis by laterally shifting the virtual axis to a new virtual axis that is parallel to the virtual axis;
- the second modification unit includes a second input device allowing modification of virtual axis by pivoting the virtual axis around the point on the virtual axis.

10. The device of claim 7, wherein the axis designator includes at least one of the first modification unit and the second modification unit,
- the first modification unit includes a first input device allowing modification of the virtual axis by laterally shifting the virtual axis to a new virtual axis that is parallel to the virtual axis;
- the second modification unit includes a second input device allowing modification of the virtual axis by pivoting the virtual axis around the point on the virtual axis.

11. The aircraft of claim 8, wherein the axis designator includes at least one of the first modification unit and the second modification unit,
- the first modification unit includes a first input device allowing modification of the virtual axis by laterally shifting the virtual axis to a new virtual axis that is parallel to the virtual axis;
- the second modification unit includes a second input device allowing modification of the virtual axis by pivoting the virtual axis around the point on the virtual axis.

* * * * *